United States Patent
Albou et al.

(10) Patent No.: US 8,749,873 B2
(45) Date of Patent: Jun. 10, 2014

(54) MOTOR VEHICLE PART

(75) Inventors: Pierre Albou, Paris (FR); Jean-Claude Puente, Livry Gargan (FR)

(73) Assignee: Valeo Vision, Bobigny (FR)

(*) Notice: Subject to any disclaimer, the term of this patent is extended or adjusted under 35 U.S.C. 154(b) by 0 days.

(21) Appl. No.: 13/449,585

(22) Filed: Apr. 18, 2012

(65) Prior Publication Data

US 2013/0077153 A1 Mar. 28, 2013

(30) Foreign Application Priority Data

Sep. 27, 2011 (FR) ...................................... 11 58649

(51) Int. Cl.
  *G02B 26/00* (2006.01)
  *G02F 1/07* (2006.01)
  *G02F 1/167* (2006.01)

(52) U.S. Cl.
  CPC ...................................... *G02F 1/167* (2013.01)
  USPC .......................................... 359/296; 359/245

(58) Field of Classification Search
  USPC ............................ 359/245, 253, 265, 275, 296
  See application file for complete search history.

(56) References Cited

U.S. PATENT DOCUMENTS

| | | | | |
|---|---|---|---|---|
| 5,105,179 A | * | 4/1992 | Smith | ............................ 340/468 |
| 6,473,072 B1 | | 10/2002 | Comiskey et al. | |
| 6,738,050 B2 | | 5/2004 | Comiskey et al. | |
| 7,923,962 B2 | * | 4/2011 | Jovanovich | .................... 320/101 |
| 8,073,590 B1 | * | 12/2011 | Zilka | ................................ 701/36 |
| 2003/0067427 A1 | | 4/2003 | Comiskey et al. | |
| 2007/0285361 A1 | | 12/2007 | Jovanovich | |
| 2008/0267034 A1 | | 10/2008 | Zhou et al. | |

FOREIGN PATENT DOCUMENTS

| | | |
|---|---|---|
| DE | 102008042184 | 3/2010 |
| EP | 0704342 | 4/1996 |
| EP | 1806714 | 7/2007 |
| WO | 2005082671 | 9/2005 |
| WO | 2005098510 | 10/2005 |

* cited by examiner

*Primary Examiner* — William Choi
(74) *Attorney, Agent, or Firm* — Jacox, Meckstroth & Jenkins

(57) ABSTRACT

A motor vehicle part having at least one portion visible from the outside of the part, characterized in that the portion is at least partly covered with an electronic ink suitable for forming a pattern on the portion. A method is also disclosed for manufacturing such a part and a method for manufacturing a subassembly incorporating this part. Another embodiment relates to a set of parts, a marking assembly, an optical unit and a vehicle comprising such a part.

31 Claims, 4 Drawing Sheets

MOTOR VEHICLE PART

CROSS-REFERENCE TO RELATED APPLICATIONS

This application claims priority to French Application No. 1158649 filed Sep. 27, 2011, which application is incorporated herein by reference and made a part hereof.

BACKGROUND OF THE INVENTION

1. Field of the Invention

The present invention relates in particular to a motor vehicle part and to a method for manufacturing this part.

2. Description of the Related Art

The customization of motor vehicles is an aspect which is of increasing importance among vehicle users and potential buyers.

This customization also relates to the esthetic appearance of the vehicles. The configurators proposed on Internet web sites of most motor vehicle manufacturers are good examples. In addition to the choice of vehicle color, it is possible to add chrome plated beads in various positions. It is also possible to differentiate the vehicle through the visual aspect obtained by the daytime light function, this function constituting a true visual signature enabling a vehicle type or a make to be easily identified.

These vehicle customization possibilities lead to a very large number of possible combinations, thereby generating heavy logistical and stock constraints. Nevertheless, there is a demand for even more customization of the vehicles, in particular when they are not running. For example, some users customize the headlight bezels. As a reminder, a headlight usually comprises a housing cooperating with a protective lens to house a light source associated with a reflector. A bezel is generally arranged between the lens and the reflector to mask the components of the projector arranged behind the reflector and the portions of the housing which would be visible during the movements of the reflector provoked by the range correction system. The bezel may have a not inconsiderable surface area. It is possible to customize them visually.

Known solutions thus consist in gluing onto the bezel labels that are visible from the outside and that carry a pattern. The labels are glued during the manufacturing of the headlight, typically before its lens is sealed. These solutions present a drawback in terms of reliability. As it happens, over time, because of the high amplitude thermal cycles and the inevitable ingress of moisture due to the operation of the headlight, the labels have a tendency to become unglued which may prove prejudicial if they block the light source or worse, if they ignite on contact with the latter.

Other solutions provide for the etching of the bezels by means of dedicated tools. For each pattern, tools have to be produced. Since these tools represent a significant investment, these solutions are not suited to small production runs and induce significant costs.

Other solutions consist in marking the bezels by laser. The time to produce each bezel and the selling cost are prohibitive.

Thus, the known technical solutions do not therefore allow for a great deal of customization of the vehicles parts, such as the headlight bezels, for small and medium production runs, while keeping costs limited.

SUMMARY OF THE INVENTION

The present invention aims to limit at least some of the drawbacks of the existing solutions. More particularly, it aims to provide a technical solution that facilitates the customization of vehicle parts, such as headlight bezels for example, while reducing the production costs.

To this end, the invention provides for a motor vehicle part comprising at least one portion visible from outside the part, wherein the portion is at least partly covered with electronic ink suitable for forming a pattern on the portion.

Thus, the ink or the electronic paper is visible from the outside of the part.

A pattern can be displayed by the electronic ink on the visible portion of the part. Since the variety of patterns that can be displayed is very great, the degree of customization of the part is also considerable.

In addition, the pattern remains in the absence of any use of the vehicle and in the absence of any current power supply. The pattern therefore remains when the vehicle is not running. Moreover, the electronic ink makes it possible to display patterns that are perfectly visible even in relatively low light.

The invention thus makes it possible to customize the part concerned easily and less expensively since no specific pattern tools are required.

Optionally, the part according to the invention may also comprise at least any one of the following optional characteristics:

the electronic ink is arranged in electronic paper form. It is contained in a sheet which is applied to the visible wall. This embodiment offers a benefit in terms of ease of deposition. Furthermore, it does not require any dedicated tools.

According to one alternative, the electronic ink, comprising at least one active layer and an electrode, is deposited directly on the portion of the part. Advantageously, this embodiment offers improved resistance over time.

The part is configured to be incorporated in an optical unit capable of providing a vehicle signaling function or a lighting function.

The part forms a bezel for the optical unit. Preferably, the bezel comprises at least one opening configured to house at least partly a light source and an optical system associated with the light source. Preferably, the bezel is configured to cooperate with an external lens of the optical unit or to be housed between the lens and the optical unit.

Advantageously, the function of the optical system is to form the beam. The optical system may be a lens or a reflector.

Advantageously, the portion at least partly covered with the ink is borne by a wall of the bezel substantially perpendicular to the main direction of movement of the vehicle. Alternatively or in combination, the bezel comprises a portion covered with ink which is substantially horizontal.

The part may also form a part of an optical unit lens.

The part may also form a part of an optical unit housing.

Typically, the electronic ink or the electronic paper is arranged on an internal face of the lens or of the housing, that is to say, a face intended to face toward the interior of the headlight or of the optical unit.

The part is at least a part of a wing of the vehicle. More generally, the part is a part of a shell of the vehicle.

The part comprises connection means associated with the electronic ink and designed to cooperate with programming means configured to create or modify a pattern formed by the electronic ink. Thus, the part can be connected to a programming unit to define a pattern on the ink covering the visible portion.

The part comprises an electronic circuit board or an electronic module configured to perform an access control function so as to prevent or allow the creation or modification of the pattern. Typically, the electronic circuit board checks that the person who requests a creation or a modification of the pattern is authorized. This check can be done by means of a code, a secure card of magnetic strip or chip type, a recognition of the terminal used to make the request, etc.

The part comprises an electronic circuit board and ports configured to allow for interfacing with a computer. For example, the part comprises USB (Universal Serial Bus) ports.

The pattern comprises at least one out of: a certification, a regulatory marking, a logo, an abstract sign, a concrete sign, a digit, a letter.

The electronic ink is arranged to produce at least one colored pattern, that is to say of a color other than black or white. For example, the ink is in the form of electronic paper provided with color filters. Alternatively, the ink comprises micro-capsules of a color other than black or white.

According to another aspect of the invention, a set of parts is provided according to any one of the preceding characteristics, the parts of the set being configured to simultaneously equip the same vehicle.

Thus, the same vehicle is simultaneously equipped with a number of parts according to the invention. For example, the vehicle comprises parts incorporated in optical units arranged at the front and/or at the rear or at least partly on the wings of the vehicle.

According to another aspect of the invention, a marking assembly is provided comprising at least one part according to any one of the preceding characteristics and comprising programming means configured to be connected to the part and to create of modify a pattern formed by the electronic ink.

According to another aspect of the invention, an optical unit is provided comprising at least one part according to any one of the preceding characteristics. Thus, the invention also relates to an optical unit comprising a portion visible from the outside, wherein the visible portion is at least partly covered by an electronic paper or an electronic ink.

Optionally, the optical unit according to the invention may also comprise at least any one of the following optional characteristics:

the optical unit is configured to be arranged at the front of the vehicle. Alternatively, the optical unit is configured to be arranged at the rear of the vehicle. Alternatively or in combination with the preceding two embodiments, the optical unit extends over the wings of the vehicle.

The electronic ink or paper is visible from the outside of the optical unit.

The optical unit comprises a housing cooperating with a lens to house at least one light source and at least one bezel and in which the wall covered by the electronic ink is borne by the bezel or by the lens. Typically, the optical unit comprises at least one optical system associated with the light source. The wall covered with the electronic ink is situated between the optical system and the lens.

Advantageously, the function of the optical system is to form the beam. Typically, it comprises or is a reflector. It may also comprise a lens associated with the light source.

The optical unit comprises connection means connected to the electronic ink, the connection means comprising a connector configured to be connected to programming means so as to be able to program, via the programming means, the pattern to be displayed by the electronic ink.

According to a first advantageous option, the connection means are inaccessible from the outside of the optical unit. The modification of the pattern is thus made impossible except by opening the optical unit.

According to a second advantageous option, the connection means are accessible from the outside of the optical unit. The modification of the pattern is thus made possible without having to open the optical unit. This option is particularly advantageous to allow for an even more thorough or modifiable customization to the part without introducing any great constraints on the seal tightness of the optical unit since the latter is not open.

Advantageously, the connector forms a plug borne by the housing and designed to be connected to a complementary plug of the programming means.

According to another aspect, the invention relates to a motor vehicle comprising a part or an optical unit according to any one of the preceding characteristics. Preferably, the electronic ink or paper is visible from the outside of the vehicle. According to a particular embodiment, the part is at least partly borne by a wing of the vehicle.

According to another aspect, the invention relates to a method for manufacturing a motor vehicle part, the part comprising a portion visible from the outside of the part, the method comprising a step of covering at least a part of the portion with an electronic ink.

According to a particular embodiment, the electronic ink is connected to connection means configured to cooperate with programming means configured to create or modify a pattern formed by the electronic ink, the method comprising a step of programming the electronic ink so as to show a pattern or an alphanumeric sign on the portion.

According to another aspect, the invention relates to a method for manufacturing a motor vehicle subassembly incorporating a part according to the invention, the part comprising connection means configured to cooperate with programming means, the method comprising: a step of connecting the connection means with the programming means; a step of programming the electronic ink so as to show a pattern on the portion; a step of incorporating the part in a subassembly performed before or after the connection and programming steps.

According to a first embodiment, the step of incorporating the part in the subassembly is performed after the connection and programming steps so that, on completion of the incorporation step, the connection means are rendered inaccessible. Thus, after the programming, it is no longer possible to access the electronic ink to block or alter the pattern. The step of incorporating the subassembly is performed so that the access to the connection means irreversibly alters the subassembly. Typically, the step of incorporating the subassembly comprises a sealing step or a snap fitting step and the subsequent opening of the subassembly causes the subassembly or the part or a seal-tightness of the subassembly to be damaged.

According to a second embodiment, the step of incorporating the part in a subassembly is performed so that, on completion of the incorporation step, the connection means are accessible from the outside of the subassembly. The programming of the pattern can thus be done without having to dismantle the subassembly.

According to an advantageous option, the programming step is performed on a production or assembly line for the subassembly incorporating the part and before the vehicle is finalized. Typically, the programming of the pattern is performed in series production during the manufacture of the subassembly which will then be mounted on a vehicle. For example, the programming may relate to the regulatory marking of the optical units. This marking can thus be done as late as possible but before the finalization of the optical unit and before it is incorporated in the vehicle. It is thus possible to determine in which optical unit a given part will be assembled. It is thus possible to adapt the marking or the certification of this part according to the optical unit or even the vehicle in which this part will be incorporated. For example, for an optical unit or for a vehicle dedicated to the British market, the part will be marked in accordance with British regulations. There is thus an assurance that each part, typically a bezel or a lens, will be given the marking that is appropriate to it in a simple manner and without having to build up significant stocks. Currently, in practice, the marking of the parts forming the optical unit is performed a long way upstream of the assembly of the optical unit and, a fortiori, a long way upstream of the incorporation of the optical unit in the vehicle. The result of this is marking inadequacies resulting in wastage of optical unit parts. To avoid this wastage, certain manufacturers build up significant stocks of parts having different markings, which inevitably results in a non-optimal management of the stocks and reduced cost effectiveness. Moreover, the markings on the lenses are generally produced by molding and it is therefore necessary to have numerous tools specific to the different traffic systems (driving on the left, driving on the right in Europe, driving on the right in the United States, etc.).

According to another advantageous option, the programming step is performed after the vehicle is finalized. Typically, the connection step and the programming step are performed in a vehicle customization workshop, in a garage or by the user of the vehicle. Advantageously, the pattern can be modified throughout the life of the vehicle or of the subassembly. The pattern is therefore not definitive unlike in the known solutions consisting in etching the bezel.

Other features, aims and advantages of the present invention will become apparent on reading the following detailed description, and in light of the appended drawings, given as nonlimiting examples and in which:

BRIEF DESCRIPTION OF THE ACCOMPANYING DRAWINGS

DETAILED DESCRIPTION OF THE PREFERRED EMBODIMENTS

Figure 1:
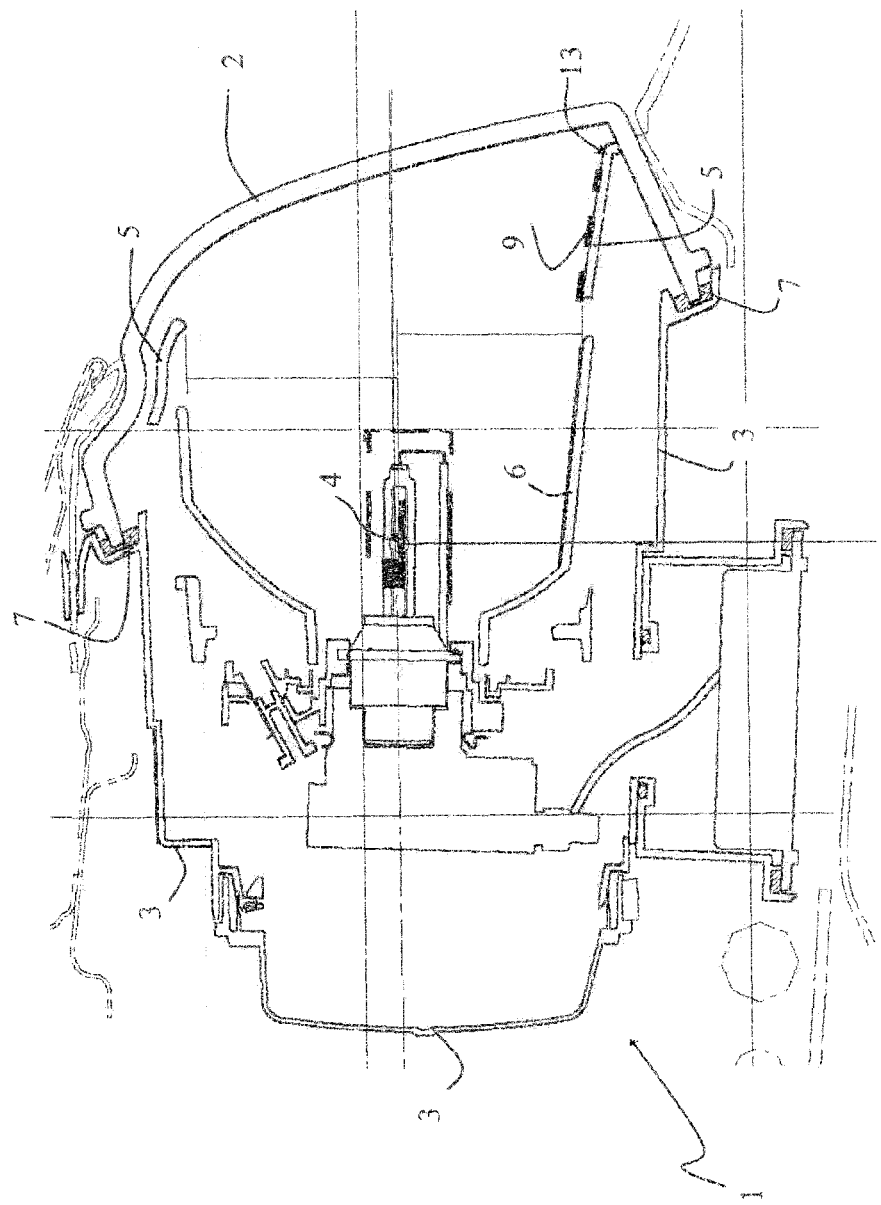
FIG. 1 is a diagram illustrating a transversal cross section of an optical unit comprising a part according to an exemplary embodiment of the invention, the part forming a bezel for the optical unit in this example.

It is specified that, in the context of the present patent application, the term "cover" does not necessarily mean "in contact with". Thus, for example, the deposition of an electronic ink or of an electronic paper on a portion of a part does not necessarily mean that the electronic ink or the electronic paper is directly in contact with the portion but it means that the electronic ink or that the electronic paper at least partly covers the portion while being either directly in contact with it or being separated from it by another layer or film.

In the present patent application, any visual form formed by the electronic ink qualifies as a pattern. The pattern may comprise at least one out of: a concrete object, an abstract object, a logo, one or more alphanumeric characters, one or more signs that have a meaning in any language.

There will be recalled that an electronic ink is a material consisting of very many capsules, typically millions of capsules, the position or the orientation of which can be locally modified under the effect of an electrical field so as to generate patterns.

One of the most commonplace solutions relies on a composition containing transparent micro-capsules of at least two different types. A first type of micro-capsules contains particles of a first color, typically white particles and a second type of micro-capsules contains particles of a second color, typically black particles. These particles, under the effect of an electrical field, are aligned or not aligned on a surface, according to their positive or negative polarization. All the micro-capsules of a particular type react in the same way under the effect of the electrical field. Depending on the electrical field generated on a given surface, the particles of a given color are attracted and the other particles repelled. The surface then assumes the color of the attracted particles.

The electronic ink can be "printed" on a plastic skin which, combined with a layer of circuits, serves as electronic paper. A number of companies offer electronic paper, including the American company E-Ink Corporation located in Cambridge, Mass., also known by the name E-Ink.

In this patent application, it is equally possible to use electronic ink as the stack of layers comprising this composition and serving as a support for the composition. This stack of layers is usually called "electronic paper". In the present invention, the electronic ink can be replaced by the electronic paper and vice versa.

Preferably, the electronic ink will be deposited directly on the part to be covered in the context of large series production runs. This solution is advantageous in terms of costs. Furthermore, it offers an enhanced reliability for the resistance of the ink on the part.

Preferably, an electronic paper will be used that will be glued onto the part to be covered in the context of small series production runs. In practice, this solution does not require any investment in terms of tools.

The invention is not limited to just black patterns on white backgrounds or white patterns on black backgrounds but extends to all color patterns. It also extends to patterns having a number of colors.

FIG. 1 illustrates an optical unit 1. The optical unit 1 comprises a housing 3 and a lens 2 which cooperates with the housing 3 to form a sealed enclosure. The seal-tightness can be complemented by means of gaskets 7. At least one light source 4 is housed inside the enclosure. Only one source 4 appears in the cross-sectional view. The source 4 is associated with a reflector 6. A bezel 5 is provided. It is arranged mainly between the lens 2 and the reflector 6. According to an embodiment that is not illustrated, a part of the bezel 5 may nevertheless extend toward the bottom of the optical unit 1 in the direction of the housing 3. Generally, the bezel 5 is used to block the components of the optical unit 1 apart from the internal wall of the reflector 66.

Figure 2:
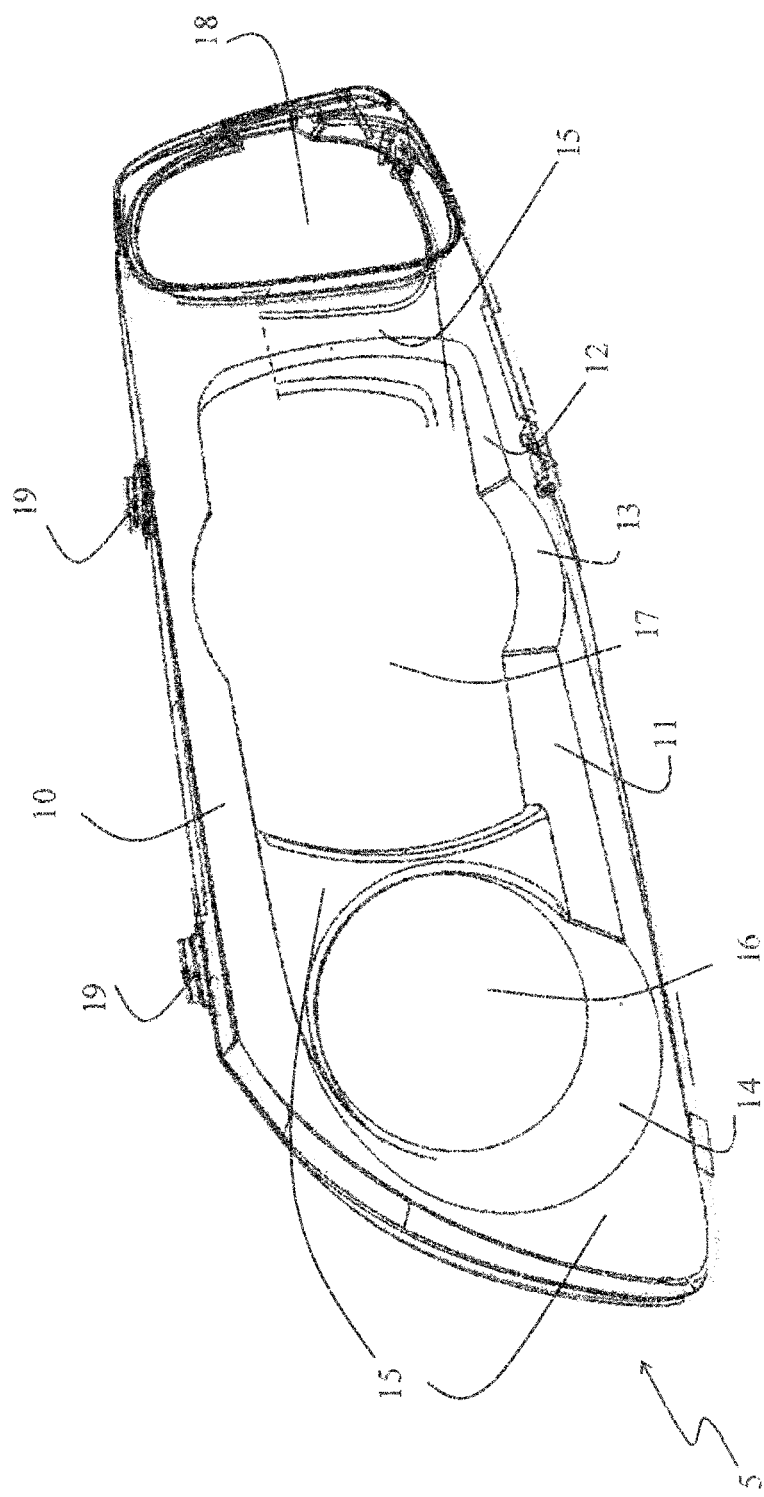
FIG. 2 is a perspective view of a bezel according to an exemplary embodiment of the invention, this bezel being suitable for incorporation in the unit of FIG. 1.

FIG. 2 illustrates the bezel 5 in more detail. The bezel comprises three openings: an external opening 16, a central opening 17 and an internal opening 18. Each opening is configured to receive a reflector 6 and at least one light source 4.

The bezel 5 extends over the perimeter of the openings 16, 17, 18. It has a top cross-member situated above the openings 16, 17, 18 and forming a first portion 10. It also has a bottom cross-member situated under the openings 16, 17, 18. In the example illustrated, this cross-member comprises a concave portion 13 arranged substantially level with the middle of the central opening 17 and two portions 11, 12, substantially horizontal and planar, arranged under the central opening and on either side of the portion 13. A portion 14 is arranged under the external opening 16. It has a substantially concave form and forms the perimeter of the external opening 16.

Intermediate walls extend from the top and bottom crossmembers. These walls bear the references 15 in FIG. 2.

These walls 10, 11, 12, 13, 14, 15 are visible from the outside of the optical unit 1 when the bezel 5 is incorporated in the latter.

In a manner that is characteristic of the invention, at least one of these walls is covered with an electronic ink or an electronic paper as illustrated in FIG. 1.

Thus, by programming the electronic paper, it is possible to show a pattern 9 on these walls.

The walls 10, 15 are substantially perpendicular to the direction of observation of the vehicle. An observer situated at a good distance from the vehicle (typically several meters) will therefore have a good view of these walls and of the pattern 9 that they may bear.

The walls 11, 12, 13, 14 extent essentially horizontally and face upward. The surfaces, and the patterns that they may bear, will therefore be clearly visible to an observer situated in the immediate proximity of the vehicle, typically less than five meters away. Such will be the case of a pedestrian alongside a parked vehicle.

Preferably, the bezel comprises fixing means 19 to facilitate its assembly in a subassembly consisting of the optical unit 1.

A number of embodiments can be employed to deposit the electronic ink or the electronic paper on the part.

According to one embodiment, the electronic ink is in the form of electronic paper. Typically, the ink is contained between a number of layers including a transparent layer constituting an outer face and another layer constituting an inner face. At least one of the two layers is in contact with at least one electrode which, when supplied with electricity, can generate an electric field for locally attracting/repelling or orienting a given type of capsules containing the ink. The inner layer is fixed to the visible wall of the part, a part which is in this nonlimiting example a bezel 5 for an optical unit 1. The paper is thus deposited directly on the part. The fixing is obtained by gluing, for example by means of a standard glue. It can also be obtained by welding or by overmolding.

The electronic ink is associated with electrical connection means linked to the electrodes enabling the electrical field to be generated in the electronic ink. The connection means are arranged to cooperate with programming means. Typically, the programming means comprise a programming unit having a user interface via which it is possible to create, choose or download a pattern. These programming means also comprise connection means complementing those of the part.

Depending on the accessibility of the connection means, a number of exemplary programming methods can be envisaged in the context of the invention.

According to a first programming mode, the connection means of the part are rendered inaccessible when the part is assembled with a subassembly of the vehicle, the subassembly typically being an optical unit 1. It is not then possible to modify or create a pattern after producing the optical unit 1. The latter is, for example, configured so that its opening so as to allow access to the connection means of the part partly causes it to break and/or causes its seal-tightness to be damaged.

This exemplary embodiment is particularly well suited to patterns constituting a certification or a regulatory marking which must not be able to be modified after the optical unit 1 has been manufactured. Preferably, the programming method then comprises a step for producing the pattern prior to the finalization of the subassembly in which the electronic ink or the electronic paper is incorporated. This step can be performed when the electronic paper already covers the visible portion of the part. Advantageously, this programming step is performed when all the components of the optical unit 1 are ready to be assembled. Thus, it is possible to adapt the regulatory marking according to the optical unit 1 ready to be produced in order to guarantee a perfect match between the marking and the optical unit. A pattern bearing a European marking will therefore be associated with a part ready to be incorporated in an optical unit 1 compliant with the European standard or intended for the European market. A marking is thus avoided which does not correspond to the standards of the optical unit or to its destination market.

This first programming mode according to which the connection means are rendered inaccessible when the part is incorporated in its subassembly, allows for a good customization while avoiding the drawbacks of the known solutions: labels specific to each pattern, tools dedicated to each pattern, laser etching of each of the patterns, etc. Moreover, this first programming mode considerably simplifies the sealing of the optical unit 1 and prevents the modification of the pattern after the subassembly incorporating the part partly covered with electronic ink has been manufactured.

Figure 3A:
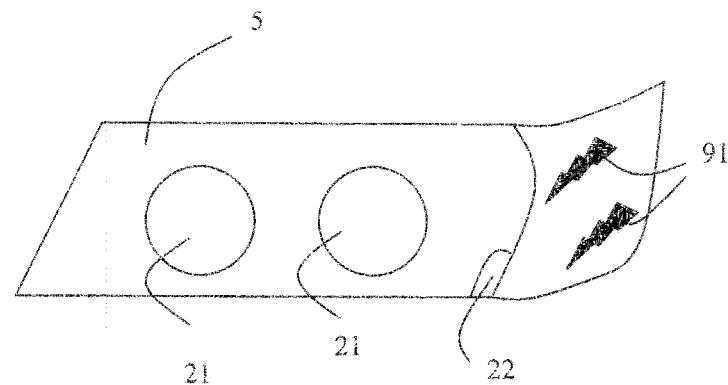
FIGS. 3A and 3B represent two embodiments of a bezel according to the invention in which the bezels each have a connector.

FIG. 3A illustrates a bezel 5 according to this first embodiment. The bezel 5 comprises two openings 21, 21 for the passage of reflectors. It also comprises a visible portion partly covered with ink or electronic paper to display a pattern 91. The bezel 5 also comprises a connector 22, also called plug, configured to cooperate with a complementary connector also called complementary plug. In this example, the bezel 5 is configured so that, once the optical unit is assembled, the connector 22 is inaccessible from the outside of the optical unit. The programming of the pattern is thus not possible without dismantling the latter.

According to a second programming mode, the programming of the electronic paper or of the electronic is performed when the subassembly is finalized.

According to a first option, the connection means are accessible when the subassembly is finalized. For example, in the case of an optical unit 1, the connection means comprise a connector borne by the housing 3 and accessible from the outside of the optical unit.

According to a second option, the subassembly can be at least partially opened or dismantled to access the connection means, for the time it takes to perform the programming and before reassembling it. Typically, the optical unit 1 can be dismantled from the vehicle and opened to access the connection means then reclosed and reincorporated on the vehicle.

It is then possible to program the pattern when the optical unit 1 is completed. Typically, the programming step comprises the coupling of a connector of the optical unit 1 with a complementary connector of the programming means then a step for indicating the pattern to be produced.

The programming step can thus be carried out in the factory at the end of the manufacturing of the optical unit 1. It can also be performed on the premises of a distributor of the optical unit 1, or even in a garage equipped with programming means.

The programming step can also be performed when the subassembly incorporating the electronic paper or the electronic ink is assembled on the vehicle. The programming step can thus be performed at the end of the vehicle production line, for example on the premises of a dealer, in a garage, or even by the user of the vehicle.

Figure 3B:
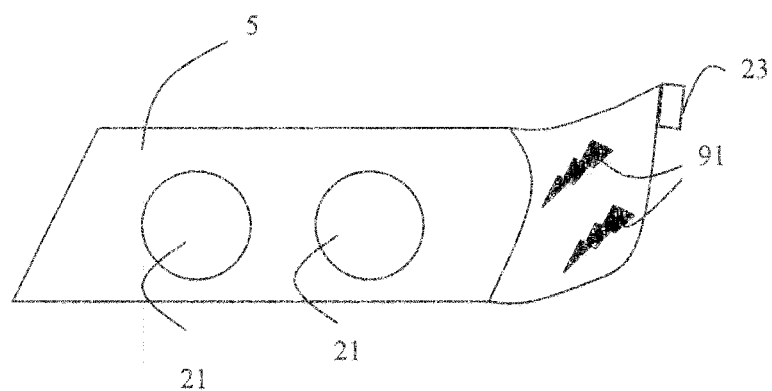

FIG. 3B illustrates a bezel 5 according to this first embodiment. In this example, the bezel 5 is configured so that, once the optical unit is assembled, the connector 23 remains accessible from the outside of the optical unit. The programming of the pattern can thus be done without having to dismantle the latter.

Preferably, the connector 23 comprises means for interfacing with a computer of personal computer type (usually designated by the acronym PC). For example, the connector comprises USB ports. Thus, the programming of the patterns to be displayed is simple and requires no particular equipment. It is thus possible to perform the programming at numerous sites without requiring prohibitive investments.

For the programming, programming means that are independent of the vehicle can be used. Typically, the programming means then comprise a computer and a user interface to define the pattern. They also comprise connection means complementing those of the optical unit 1. The connection means are, for example, accessible by opening the front or rear lid of the vehicle. Alternatively, the programming means are incorporated in the vehicle. The pattern can thus be programmed directly from the interface of the vehicle. Preferably, the connection means for the electronic paper or the electronic ink are configured to be connected to the bus of the vehicle.

This second embodiment allows for a very strong customization of the patterns since the programming is performed at the end of the manufacturing of the optical unit 1, even at the end of the manufacturing of the vehicle, or even at any time during the life of the vehicle.

Figure 4:
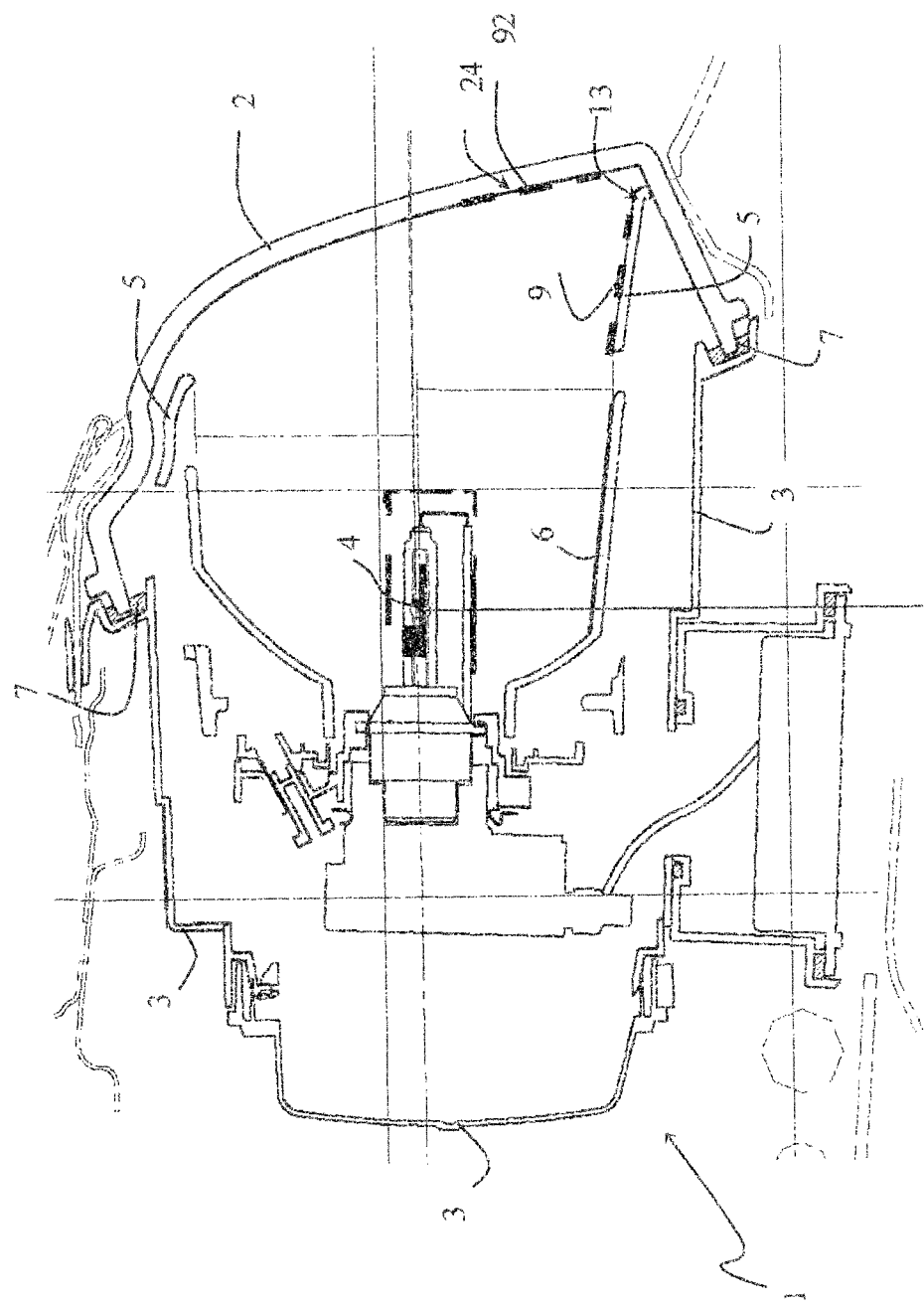
FIG. 4 illustrates the optical unit according to FIG. 1 and in which the internal face of the lens is partly covered with electronic ink.

FIG. 4 illustrates a headlight in which the lens 2 comprises a portion 24 visible from the outside of the optical unit and at least partly covered with electronic ink or paper. Preferably, the electronic ink or paper is deposited on the internal face of the lens 2. The pattern 92 displayed can be a decorative pattern or a regulatory marking. In this example, the bezel 5 also bears one or more patterns 9.

According to an advantageous embodiment, the part covered with electronic ink or paper or the subassembly incorporating it (optical unit for example) comprises an electronic circuit board for allowing or preventing the modification of the patterns. This can be done according to predefined restrictions. The electronic circuit board can also be configured to allow pattern modifications if at least one of the following actions is performed successfully: input of a confidential code, recognition of a secure card, recognition of a given hardware item, check on an approval.

Thus, it is possible to limit the capacity to modify the patterns to a given set of approved garages or agents.

According to an embodiment that is not illustrated, the electronic ink or paper can be arranged at least partly on the housing of the headlight.

In light of the above description, it is clearly apparent that the invention allows for a significant improvement in the possibilities for customizing vehicle parts while limiting the associated costs.

The invention is not limited to the embodiments described, but extends to any embodiment in line with its spirit.

In particular, the part that is the subject of the invention which is at least partly covered with electronic ink or electronic paper is not limited to a part for an optical unit, even though this application is particularly advantageous.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A motor vehicle part for mounting on a motor vehicle comprising at least one portion visible from outside said motor vehicle part, wherein said at least one portion is at least partly covered with an electronic ink suitable for forming a pattern on said at least one portion;
   wherein said motor vehicle part is incorporated in an optical unit for forming a beam that is mounted outside a passenger compartment of the motor vehicle;
   wherein said optical unit comprises at least one light source for providing light for illuminating an area around said motor vehicle; and
   wherein said motor vehicle part is a component of said optical unit and comprises said at least one portion that is at least partly covered with said electronic ink to provide said pattern.

2. The motor vehicle part according to claim 1, in which said electronic ink is arranged in electronic paper form.

3. The motor vehicle part according to claim 1, wherein said component is arranged to form a bezel for said optical unit.

4. The motor vehicle part according to claim 3, in which said bezel comprises at least one opening configured to house at least partly a light source and an optical system associated with said light source.

5. The motor vehicle part according to claim 1, wherein said component is arranged to form at least a part of a protection lens of said optical unit.

6. The motor vehicle part according to claim 1, wherein said component is arranged to form a housing for said optical unit.

7. The motor vehicle part according to claim 1, wherein said optical unit further comprises connection means associated with said electronic ink and designed to cooperate with programming means configured to create or modify said pattern formed by said electronic ink.

8. The motor vehicle part according to claim 1, wherein said optical unit further comprises an electronic circuit board or an electronic module configured to perform an access control function so as to prevent or allow a creation or modification of said pattern.

9. The motor vehicle part according to claim 1, wherein said optical unit further comprises an electronic circuit board and ports configured to allow for interfacing with a computer.

10. The motor vehicle part according to claim 1, in which said electronic ink defines said pattern comprising at least one among: a certification, a regulatory marking, a logo, an abstract sign, a concrete sign, a digit, a letter.

11. The motor vehicle part according to claim 1, wherein said motor vehicle part comprises a set of parts, said parts of said set of parts being configured to simultaneously equip the same vehicle.

12. A marking assembly comprising at least one part according to claim 1 and comprising programming means configured to be connected to said at least one part and to create or modify said pattern formed by said electronic ink.

13. An optical unit comprising at least one part according to claim 1.

14. The optical unit according to claim 13, comprising a housing cooperating with a lens to house at least one light source and at least one bezel and in which said at least one portion covered by said electronic ink is borne by said at least one bezel, by said lens or by said housing.

15. The optical unit according to claim 13, comprising connection means connected to said electronic ink, said connection means comprising a connector configured to be connected to programming means so as to be able to program, via said programming means, said pattern to be displayed and in which said connection means are inaccessible from the outside of said optical unit.

16. The optical unit according to claim 13, comprising connection means connected to said electronic ink, said connection means comprising a connector configured to be connected to programming means so as to be able to program, via said programming means, said pattern to be displayed by said electronic ink and in which said connection means are accessible from the outside of said optical unit.

17. The optical unit according to claim 16, in which a connector forms a plug borne by a housing and designed to be connected to a complementary plug of programming means.

18. The optical unit according to 16, in which said motor vehicle part comprises a connector connected to said electronic ink and is configured to be connected to a bus of the motor vehicle.

19. The optical unit according to claim 13, comprising an electronic circuit board or an electronic module configured for access control so as to prevent or allow a creation or modification of said pattern.

20. A motor vehicle comprising a part according to claim 1.

21. A method for manufacturing a motor vehicle subassembly incorporating a part according to claim 1, the part comprising connection means configured to cooperate with programming means, the method comprising a step of connecting the connection means with said programming means; a step of programming said electronic ink so as to show said pattern on said portion; a step of incorporating said motor vehicle part in a subassembly, the incorporation step being performed before or after the connection and programming steps.

22. The method for manufacturing a motor vehicle subassembly according to any claim 21, in which the step of incorporating the part in a subassembly is performed so that the access to said connection means irreversibly alters the subassembly.

23. The method for manufacturing a motor vehicle subassembly according to claim 21, in which the step of incorporating said motor vehicle part in a subassembly is performed so that, on completion of the incorporation step, said connection means are rendered accessible from the outside of said subassembly.

24. The method for manufacturing a motor vehicle subassembly according to claim 21, in which the programming step is performed before the vehicle is finalized.

25. The method for manufacturing a motor vehicle subassembly according to claim 21, in which the programming step is performed after the vehicle is finalized.

26. A method for manufacturing a motor vehicle subassembly incorporating a part according to claim 1, the part comprising connection means configured to cooperate with programming means, the method comprising a step of connecting the connection means with said programming means; a step of programming said electronic ink so as to show said pattern on said portion; a step of incorporating said motor vehicle part in a subassembly, the incorporation step being performed before or after the connection and programming steps;
   wherein said step of incorporating said motor vehicle part in a subassembly is performed after the connection and programming steps and so that, on completion of the incorporation step, said connection means are rendered inaccessible from the outside of said subassembly.

27. An optical unit comprising the part according to claim 1.

28. The motor vehicle part according to claim 1, wherein said electronic ink is on a face of said optical unit.

29. The motor vehicle part according to claim 28, wherein said face is an internal face of said optical unit.

30. The motor vehicle part according to claim 1, wherein said light is a headlight.

31. A method for manufacturing a motor vehicle part, said motor vehicle part comprising a portion visible from the outside of said motor vehicle part, the method comprising a step of covering at least a part of said portion with an electronic ink;
   wherein said motor vehicle part is incorporated in an optical unit for forming a beam that is mounted outside a passenger compartment of the motor vehicle;
   wherein said optical unit comprises at least one light source for providing light for illuminating an area around said motor vehicle; and
   wherein said motor vehicle part is a component of said optical unit and comprises said at least one portion that is at least partly covered with said electronic ink to provide said pattern.

* * * * *

UNITED STATES PATENT AND TRADEMARK OFFICE
CERTIFICATE OF CORRECTION

PATENT NO. : 8,749,873 B2  
APPLICATION NO. : 13/449585  
DATED : June 10, 2014  
INVENTOR(S) : Pierre Albou et al.

Page 1 of 1

It is certified that error appears in the above-identified patent and that said Letters Patent is hereby corrected as shown below:

In the claims

Claim 31, column 12, line 45, delete "said" and insert -- a -- therefor.

Signed and Sealed this
Twenty-second Day of December, 2015

Michelle K. Lee
*Director of the United States Patent and Trademark Office*